US006256043B1

(12) United States Patent
Aho et al.

(10) Patent No.: US 6,256,043 B1
(45) Date of Patent: Jul. 3, 2001

(54) THREE DIMENSIONAL VIRTUAL REALITY ENHANCEMENT TECHNIQUES

(75) Inventors: Alfred Vaino Aho, Chatham; Sudhir Raman Ahuja, Little Silver; Gianpaolo U. Carraro; James Robert Ensor, both of Red Bank; Eugene J. Rosenthal, Edison, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/938,304

(22) Filed: Sep. 26, 1997

(51) Int. Cl.[7] .................................................. G06T 11/00
(52) U.S. Cl. ......................... 345/433; 345/428; 345/474; 345/972
(58) Field of Search .................................. 345/419, 433, 345/428, 474, 972

(56) References Cited

U.S. PATENT DOCUMENTS

| | | | |
|---|---|---|---|
| 5,261,041 | * 11/1993 | Susman | 345/473 |
| 5,347,628 | * 9/1994 | Brewer et al. | 395/159 |
| 5,539,871 | * 7/1996 | Gibson | 395/154 |
| 5,602,564 | * 2/1997 | Iwamura et al. | 345/119 |
| 5,682,506 | * 10/1997 | Corby, Jr. et al. | 395/119 |
| 5,815,411 | * 9/1998 | Ellenby et al. | 364/559 |
| 5,848,399 | * 12/1998 | Burke | 705/27 |
| 5,898,429 | * 4/1999 | Trom et al. | 345/302 |

OTHER PUBLICATIONS

European Search Report dated Oct. 10, 1999 for Application No. EP 98 30 5992.
Benford, S. et al. "Exploiting Virtual reality as a Conceptual Model for CSCW". IEE Colloquium on Using Virtual Worlds. pp. 1/1–1/5, 1992.*
Deering, M.F. "Explorations of display interfaces for virtual reality". International Symposium on Virtual Reality 1993. IEEE/EE Publications, 1993.*
Maes et a. "The ALIVE System: Full–body Interaction with Autonomous Agents." Proceedings of Computer Animation '95. [on–line]. pp. 11–1. 1995. [retrieved 1999–07–11]/ retrieved from Internet:<URL:http://iel.ihs.com/>, 1995.*

\* cited by examiner

*Primary Examiner*—Mark Zimmerman
*Assistant Examiner*—Philip H. Stevenson
(74) *Attorney, Agent, or Firm*—Eugene J. Rosenthal

(57) ABSTRACT

For a world that has a portion of the world distant from the point of view of the user represented in only two dimensions as a video on a video screen, when an object on the video screen undergoes a trajectory that takes at least a portion of it to a location in the world that is not represented by the video but instead is a location in the world that is represented by computer graphics, in addition to being able to continue to see such an object when it is rendered as computer graphics in the computer graphics part of the world, i.e., popped out from the video, one is able to interact with such an object. Thus, an object which pops out from a video into the computer graphics part of the world may be "investigated" by a viewer of the world. For example, the user could enter a store which popped out of the video, and engage in virtual shopping therein. The particular store which is actually entered may be customized on a per user basis, e.g., as a function of geography. When the proprietor of a virtual store, or his representative, e.g., electronic agent, detects the avatar of one or more persons in the vicinity of the avatar of a store for which such proprietor's store corresponds to the virtual store for such passing persons, a message may be transmitted to such passing persons.

44 Claims, 4 Drawing Sheets

(2 of 4 Drawing Sheet(s) Filed in Color)

THREE DIMENSIONAL VIRTUAL REALITY ENHANCEMENT TECHNIQUES

TECHNICAL FIELD

This invention relates to the integration of computer graphics and video to provide a realistic three dimensional virtual reality experience.

BACKGROUND OF THE INVENTION

The display of a three dimensional world to a viewer requires considerable computation power, and it is typically costly to develop the necessary highly detailed models required for doing so. In order to simplify the problem, a portion of the world that is in the distance may be represented in only two dimensions as a video displayed on a surface, e.g., a screen. By video it is meant the common usage of the term, such as the placing or projecting of predefined images on the surface, e.g., the electronic version of filmed moving pictures. Thus, such a world is essentially truncated in length to the screen on which the video is displayed. A great reduction in computation power and cost can be achieved by such an arrangement.

In U.S. patent application Ser. No. (case Carraro-Ensor 2-7) it was recognized that a limitation of such a world occurs when an object within the field represented by the video undergoes a trajectory that takes it to a location in the world that is not represented by the video but instead is a location in the foreground which is represented by computer graphics, namely, any portion of the object that is no longer on the video screen, disappears. Therefore, when an object within the field represented by the video undergoes a trajectory that takes it, or a portion thereof, to a location in the world that is not represented by the video but instead is a location in the foreground which is represented by computer graphics, such an object or portion is made to continue to be visible to the user and is represented at the foreground location using computer graphic techniques, rather than video. Thus, the video object "pops" out of the video and becomes visible, e.g., in front of, or to the side of, the video screen, rather than becoming invisible because it is no longer on the video screen.

SUMMARY OF THE INVENTION

We have recognized that, for a world that has a portion of the world distant from the point of view of the user represented in only two dimensions as a video on a video screen, when an object on the video screen undergoes a trajectory that takes at least a portion of it to a location in the world that is not represented by the video but instead is a location in the world that is represented by computer graphics, in addition to being able to continue to see such an object when it is popped out from the video into the computer graphics part of the world, it is advantageous for one to be able to interact with such an object. Therefore, in accordance with the principles of the invention, an object which pops out from a video into the computer graphics part of the world may be "investigated" by a viewer of the world. One way that this may be achieved is by receiving an indication of a selection of such an object by a user and, in response thereto, providing the user with additional information about the selected object. Another way that this may be achieved is by receiving an indication of a selection of such an object by a user and, in response thereto, allowing the user to explore within the selected object.

For example, if the user is bicycling down the Champs Elysees in Paris, France, as one approaches La Place de l'Etoile in the center of which is the Arc de Triomphe, built by Napoleon Bonaparte, and the Arc de Triomphe as it is passed by the bicyclist pops out of the video, the user could click on the popped-out Arc de Triomphe which is now in the computer graphics part of the world and obtain historical information about it, e.g., displayed in a window on the screen. Alternatively, if the user is represented in the world as an avatar riding on a bicycle, the user avatar, in response to appropriate commands, such as mouse clicks, could be made to dismount the bicycle and further investigate the Arc de Triomphe, e.g., entering therein, ascending a set of stairs and looking out from one or more viewpoints. The user could then return to his bicycle and continue his journey in the world which has a portion of the world distant from the point of view of the user represented in only two dimensions as a video on the video screen and the remainder of the world as computer graphics.

As another example, the user could enter a store which popped out of the video, and engage in virtual shopping therein. In accordance with an aspect of the invention, the particular store which is actually entered may be customized on a per user basis. Thus, for different users who are traversing the same course and seeing the same representations, e.g., an avatar, of a store or vendor cart that popped out from the video, who the particular vendor is that will serve the user and provide him with the virtual shopping service may be different for different users. In accordance with an aspect of the invention, the particular vendor may be selected as a function of the actual geographic location of the user, or a particular location that is associated with the user. If two or more users are simultaneously exploring the same world together, e.g., two friends bicycling together, in accordance with an aspect of the invention, each user, or different subsets of the users, may be served by a different vendor, e.g., as a function of specified parameter, such as their individual geographic locations. Alternatively, even if there is more than one user, and such users would otherwise be served by different vendors, e.g., as a function of their respective locations, in accordance with an aspect of the invention, such users could specify that a subset, or all of them, should be served by a single vendor.

In accordance with another aspect of the invention, when the proprietor of a virtual store, or his representative, e.g., electronic agent, detects the avatar of one or more persons in the vicinity of, e.g., passing, the avatar of a store for which such proprietor's store corresponds to the virtual store for such passing persons, a message, such as an advertisement, or other communication, such as opening a communication channel, e.g., a chat service or voice communication channel, may be transmitted to, or initiated with, such passing persons. The communication may be general in nature or it may be customized as a function of information available regarding the passing persons. Advantageously, a feeling of community may be engendered in the virtual environment

BRIEF DESCRIPTION OF THE DRAWING

The file of this patent contains at least one drawing executed in color. Copies of this patent with color drawing (s) will be provided by the Patent and Trademark Office upon request and payment of the necessary fee.

In the drawing.

DETAILED DESCRIPTION

Figure 1:
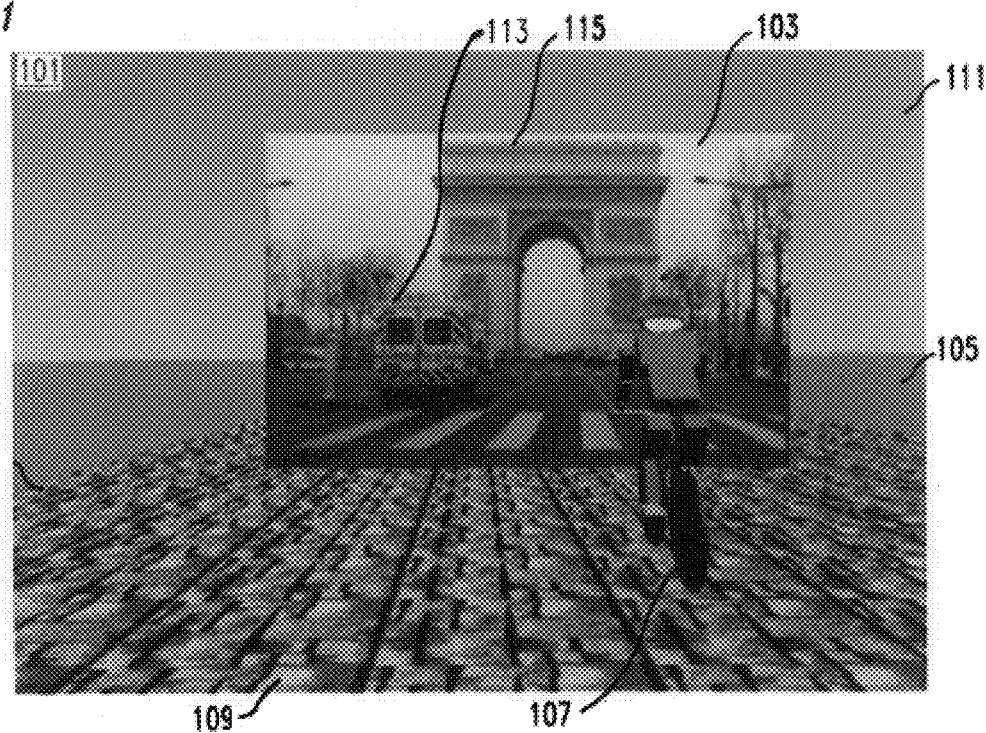
FIGS. 1–3 show an example of a video object "popping" out of a video and so becoming visible in front of, or to the side of, the video screen.
Figure 2:
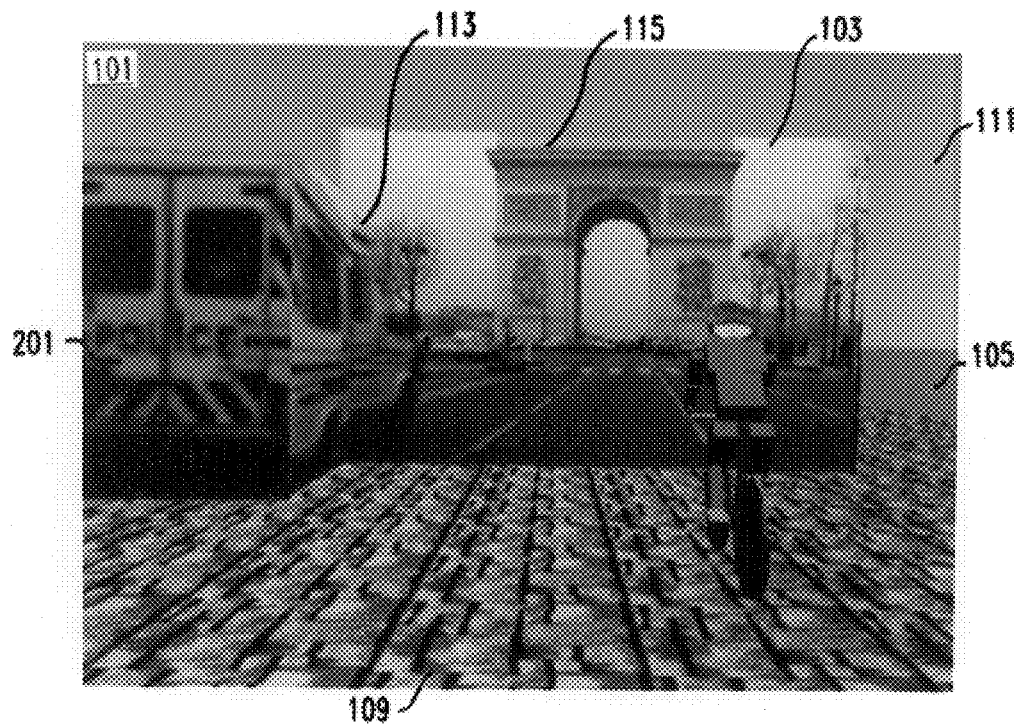
Figure 3:
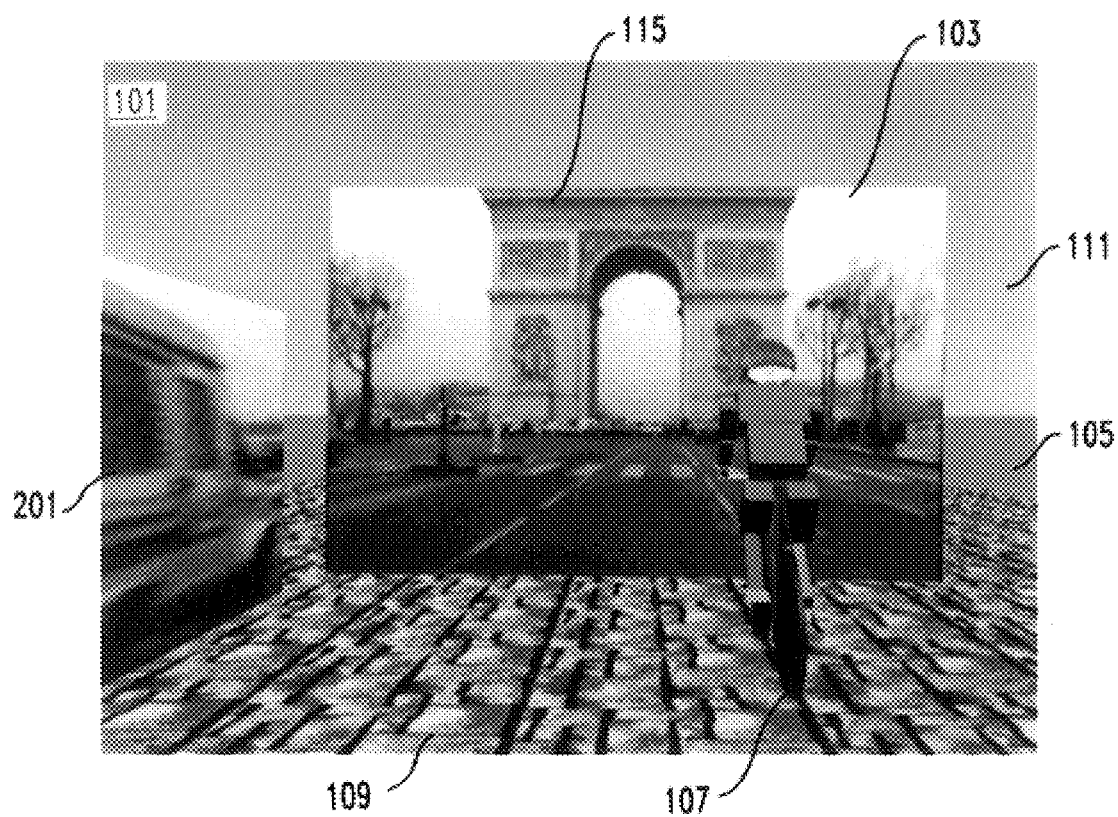

Before describing how an object which pops out from a video into the computer graphics part of the world may be "investigated" by a viewer of the world, in accordance with the principles of the invention, an example of a video object "popping" out of the video and becoming visible in front of, to the side of, above, or below the video screen, rather than simply becoming invisible because it is no longer on the video screen, is shown in FIGS. 1–3. For simplification of terminology purposes, a portion of an object may simply be referred to as an object, since any portion of an object may be considered an object in its own right.

FIG. 1 shows world 101, which is the Champs Elysees in Paris, France, as one approaches La Place de l'Etoile in the center of which is the Arc de Triomphe, built by Napoleon Bonaparte. World 101 is divided into two portions, video screen 103, on which is shown the current frame of a video and the remainder of the world 105, which is represented using computer graphics techniques, and is thus referred to herein as computer graphics part (CG Part) 105. The current frame of video being displayed on video screen 103 includes police van 113 and Arc de Triumph 115. Within CG Part 105 there are various elements, such as bicyclist 107, representing the user, road 109, and sky 111.

Note that the viewpoint of the user is actually behind the representation of the user in the form of bicyclist 107. Also note that police van 113, which is part of the current video frame being shown on video screen 103, is moving slower than bicyclist 107, so that police van 113 will eventually be passed by bicyclist 107 as he continues to ride toward Arc de Triumph 115.

FIG. 2 shows world 101 of FIG. 1, but at a later time. At the time of FIG. 2, the frame of video being shown on screen 103 is from a view closer to Arc de Triumph 115. Such a frame may have resulted, for example, from moving the camera that captured the video closer to Arc de Triumph 115. As a result of the camera location when the frame of video on screen 103 that is shown in FIG. 2 was taken, only a portion of police van 113 was captured video frame. The rest of the police van 113 was out of view of the camera, and hence is not visible within the current frame of video on screen 103 that is shown in FIG. 2. However, from the viewpoint of the user, looking at world 101 as it appears in FIG. 2, the remaining portion of police van 113 should be visible, notwithstanding that it is no longer within the boundaries of video screen 103. Therefore, the remaining portion of police van 113 is displayed using computer graphic techniques within world 101 as element 201, which is apart of CG Part 105.

FIG. 3 shows world 101 of FIG. 1, but at a time even later than that of FIG. 2. Thus, at the time of FIG. 3, the frame of video being shown on screen 103 is from a view still closer to Arc de Triumph 115 than that of FIG. 2. As a result of the camera location when the frame of video on screen 103 that is shown in FIG. 3 was taken, none of police van 113 is visible within the current frame of video on screen 103 that is shown in FIG. 3. However, from the viewpoint of the user, looking at world 101 as it appears in FIG. 3, police van 113 should be visible to the user's left, notwithstanding that it is no longer within the boundaries of video screen 103. Therefore, the entirety of police van 113 is displayed using computer graphic techniques within world 101 as element 201, which is a part of CG Part 105. At least a portion of element 201 will continue to be displayed as part of CG Part 105 until element 201 passes completely from the user's viewpoint.

Figure 4:
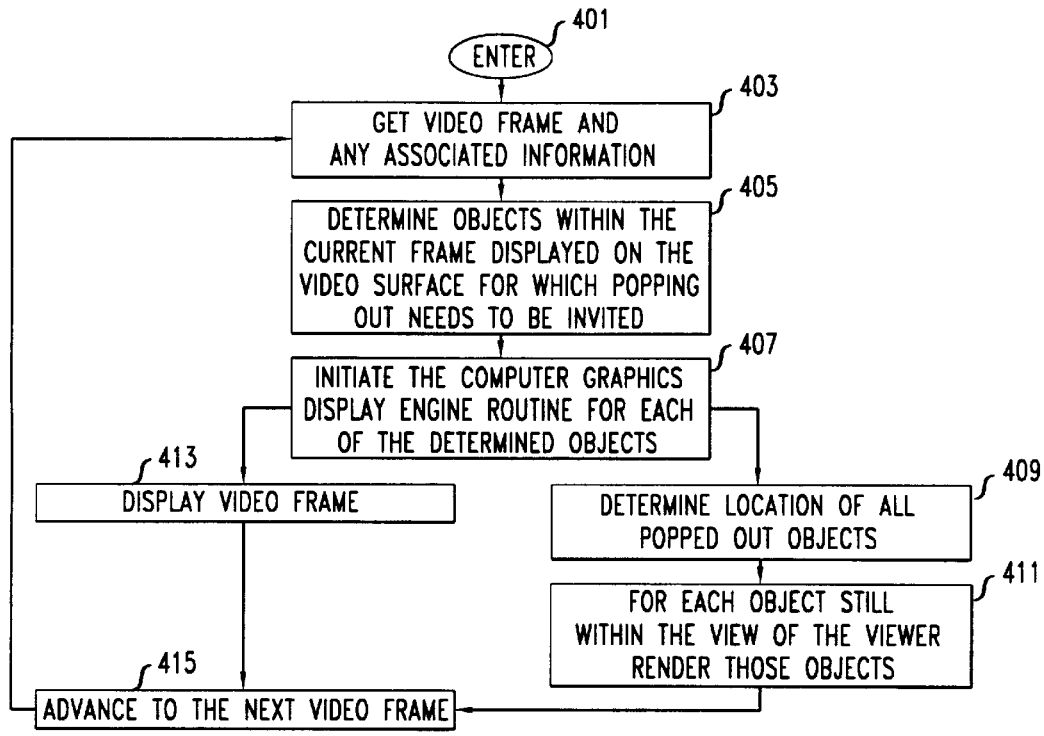
FIG. 4 shows an exemplary process by which objects within the field represented by the video surface that, due to their projected motion are to be in the three dimensional world, are so displayed using computer graphics techniques, e.g., the object "pops out" of the video surface.

FIG. 4 shows an exemplary process by which objects within the field represented by the video surface that, due to their projected motion are to be displayed in the three dimensional world, e.g., in front of, to the side of, above, or below, the video surface, are so displayed using computer graphics techniques, so that the object "pops out" of the video surface. In typical embodiments of the invention, the objects to be displayed using computer graphics are predefined, and their location in the video and the time associated with its position within the video is known, so that the time and extent at which the object needs to be popped out of the video is known. However, the techniques of the invention may be employed with computers and software which are sufficiently sophisticated to track recognizable objects within the video surface and to develop computer graphics models from such video representations in order to create the popped out computer graphics.

The process is entered in step 401 when the user selects a video to view and the first frame of the video is to be displayed to a user. In step 403, the video frame to be displayed is retrieved. This may be achieved by retrieving data representing the frame which is pointed to by a pointer. Such a frame pointer is set initially, e.g., in step 401, to point to the first frame of the video. Next, in step 405, it is determined if there are any objects with the current video frame which is to be displayed on the video screen for which popping out needs to be initiated. This may be achieved by employing additional information associated with the frame that describes any objects that need to be popped out. Such additional information may also include data necessary to render the object as well as motion data which indicates the path of the object. Alternatively, this step may be achieved by analyzing the content of the video frame, perhaps in conjunction with prior frames and future frames, to determine data necessary to render the object as well as motion data which indicates the path of the object. In addition, the viewpoint given to the user by the overall display may be incorporated in the determination. Such a viewpoint is determined by camera controls, which may be set by the user. Of course, a combination of the foregoing techniques may also be employed. In step 407, a computer graphics display engine routine is initiated for each of the objects determined in step 405. Each of these computer graphics routines are supplied with the information necessary to generate their respective objects as time passes with each frame for display on the video surface. For example, the information supplied for each object may include the aforementioned motion data which indicates the path of the object.

Next, steps 409 and 411 are performed substantially in parallel with step 413. The degree of parallelism to be achieved should enable the popped out objects to be displayed substantially while the frame is displayed so that the user perceives them as being displayed together at the same time.

In step 409, a location on the viewscreen is determined for each of objects for which a computer graphics display engine routine is executing. In step 411, each of the objects for which a computer graphics display engine routine is executing that are still within the view of the viewer are rendered. Optionally, the computer graphics display engine routine for any object that has moved so that it is no longer within the view of the viewer may be deleted. However, such computer graphics display engine routines should only be deleted provided that it is known that the motion path of the object or the viewpoint of the viewer will not again bring that object into view.

The video frame is displayed in step 413. Control then passes from both steps 411 and 413 to step 415. In step 415 the next video frame is advanced to, provided that there is one. This may be achieved by incrementing or otherwise updating the value of the frame pointer. Thereafter, control passes back to step 403 and the process continues as described above.

In another implementation of the basic process of FIG. 4, the video screen is moving within the overall three-dimensional world being displayed to the user. Instead of determining which objects require the initiating of popping out based on information about objects in the frame being displayed on the video surface, as described above, the initiation may be based on the current location of the video screen within the overall three-dimensional world being displayed to the user. For example, if the video screen is displaying a video which gives the user the feeling of traveling down the Champs Elysees each successive video frame is actually a representation of the view from a location further and further down the street. As the frames are displayed and the user's viewpoint moves further down the street, it may be necessary for objects, e.g., a bus, a pedestrian, or a parked car, to pop off the video screen and become represented by computer graphics. The computer graphics display engine routine for each of the objects may be initiated as a function of the distance traveled by the video screen down the street, which, for example, may be either indicated in additional information associated with the frame, or, for simple situations, determined as a predetermined function of the time that the video has been running.

In another embodiment of the invention, a three-dimensional world ready for rendering, including all the elements that must pop out of the video surface, is modeled in memory. The three-dimensional world includes information such as the spatial location, size and orientation for each of the elements that must pop out. Motion information for the pop out elements may also be included. In this embodiment, the video screen is moving within the overall three-dimensional world that is being displayed to the user, as described above. Each frame of the video has spatial information which describes the location of the video screen within the three-dimensional world stored in memory. Such information may be implied, e.g., if the video screen is moving at a constant rate of speed, or it may be in separate information that is associated with the video frame. Using the information about each video pop out element as well as the information about the location of the video screen allows the spatial location of each video pop out element, as well as the portion of each video pop out element that is not blocked by the video screen and is within the viewpoint of the user, to be determined for each frame. Therefore, when the video screen is at a particular location, the portion of any video pop out element that is visible, e.g., in front of or to the side of, above, or below, the video screen may be rendered on the display. Thus, a match may be achieved between what is seen on the video screen and the computer graphic pop out elements.

Figure 5:
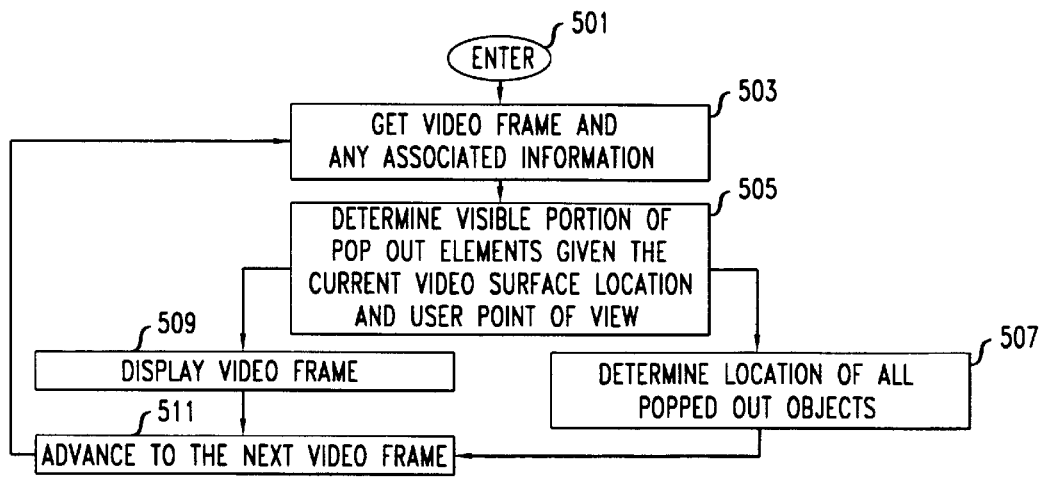
FIG. 5 shows another exemplary process by which objects within the field represented by the video surface that, due to their projected motion are to be in the three dimensional world, are so displayed using computer graphics techniques.

A process for implementing this embodiment is shown, in flow chart form, in FIG. 5. Note that prior to entering the process shown in FIG. 5 a three-dimensional world including all the elements that must pop out of the video surface must be pregenerated and stored in memory. Also, spatial information which describes the location of the video screen within the three-dimensional world must be associated with frames of the video and stored in memory.

The process is entered in step 501 when the user selects a video to view and the first frame of the video is to be displayed to a user. In step 503, the video frame to be displayed is retrieved. This may be achieved by retrieving data representing the frame which is pointed to by a pointer. Such a frame pointer is set initially, e.g., in step 501, to point to the first frame of the video. In step 505, the location of the video screen within the three-dimensional world is determined. As noted, such information may be implied, e.g. if the video screen is moving at a constant rate of speed, or it may be in separate information that is associated with the video frame. Next, in step 507, the visible portion of any pop out elements is determined as a function of the current video surface location and the user viewpoint.

Thereafter, steps 507 and 509 are performed substantially in parallel. The degree of parallelism to be achieved should enable the popped out objects to be displayed substantially while the frame is displayed, so that the user perceives them as being displayed together at the same time. In step 507, the determined visible portion of each of the pop out elements is rendered. The video frame is displayed in step 509. Control then passes from both steps 507 and 509 to step 511. In step 511 the next video frame is advanced to, provided that there is one. This may be achieved by incrementing or otherwise updating the value of the frame pointer. Thereafter, control passes back to step 503 and the process continues as described above.

The foregoing assumes that the video frame to be displayed is set, which determines the location of the video screen within the three-dimensional world. However, the converse may also be implemented, i.e., the location of the video screen within the three-dimensional world is set, and this determines which video frame is to be displayed. To do so, in step 501 or 511, in which the video frame to be displayed next is determined, the desired location of the video screen within the three-dimensional world is ascertained. This location may be specified as a function of user input. For example, if the scene being displayed corresponds to the view of a user on a bicycle, the location of the video screen may be determined by sensors mounted to a stationary bicycle which detects riding of the bicycle by the user. A search of the information identifying the location of the frames is conducted to determine which frame corresponds to the current location of the screen, and the frame pointer is set to point to that frame.

The various method of determining which frame is displayed may be used separately, or their usage may be intermixed, depending on the need of the application being implemented.

Note that frames for which it is known that no pop out elements will be displayed need not be associated with spatial information which describes the location of the video screen within the three-dimensional world stored in memory. The video is simply displayed on the video screen and no pop out elements are rendered.

Any prestored information, such as frames, and information associated therewith, as well as models of the three-dimensional world, may be stored in different segments.

Such segments may be located at a single physical location, e.g., within a single computer, or at different physical locations, such as in various computers that are connected by a network, and made available for use with embodiments of the invention. Moreover, the elements which process the information to generate the display may, but need not be, contained within a single computer.

One way that an object which pops out from a video into the computer graphics part of the world may be "investigated" by a viewer of the world, in accordance with the principles of the invention, is by receiving an indication of a selection of such an object by a user and, in response thereto, providing the user with additional information about the selected object. For example, additional information could be displayed on the display screen in response to the viewer selecting the object, such as with point and click selection system, the most common type of which are mice, trackballs, and touchpads. Alternatively, in response to the user selection, a new window could be overlayed on the video display containing additional information. Another way that this may be achieved is by receiving an indication of a selection of such an object by a user and, in response thereto, allowing the user to explore within the selected object. This may be done within the context of the world which is being explored or external thereto. One way this may be achieved is by having a uniform resource locator (URL) associated with the object in the CG part of the world. When the object is selected by the view, the viewer is taken to a page or file corresponding to the URL. Alternatively, the viewer may be jumped to another world model which corresponds to the object being further explored.

For example, if the user is bicycling down the Champs Elysees in Paris, France, as described above, and, as the Arc de Triomphe is passed by the bicyclist it pops out of the video, the user could click on the popped-out Arc de Triomphe which is now in the computer graphics part of the world and obtain historical information about it, e.g., displayed in a window on the screen. Alternatively, if the user is represented in the world as an avatar riding on a bicycle, the user avatar, in response to appropriate commands, such as mouse clicks, could be made to dismount the bicycle and further investigate the Arc de Triomphe, e.g., entering therein, ascending a set of stairs and looking out from one or more viewpoints. The user could then cause his avatar to return to the bicycle and continue the journey in the world which has a portion of the world distant from the point of view of the user represented in only two dimensions as a video on the video screen and the remainder of the world as computer graphics. The description of the interior of the Arc de Triomphe may have been directly associated with information employed for popping it out of the video or information pointing to the necessary description of the interior of the Arc de Triomphe, such as a pointer to another "world" or a URL, may have been directly associated with information employed for popping the Arc de Triomphe out of the video.

As another example, the user could enter a store which popped out of the video, and engage in virtual shopping therein. In accordance with an aspect of the invention, the particular store which is actually entered may be customized on a per user basis. Thus, for different users who are traversing the same course and seeing the same representations, e.g., an avatar, of a store or vendor cart that popped out from the video, who is the particular vendor that will serve the user and provide him with the virtual shopping service may be different for different users. In accordance with an aspect of the invention, the particular vendor may be selected as a function of the actual geographic location of the user, or a particular location that is associated with the user. If there is more than one user who are simultaneously exploring the same world together, e.g., two friends bicycling together, in accordance with an aspect of the invention, each friend may be served by a different vendor, e.g., as a function of their individual geographic locations. Alternatively, even if there is more than one user, and such users would otherwise be served by different vendors, e.g., as a function of their respective locations, in accordance with an aspect of the invention, such users could specify that a subset, or all of them, should be served by a single vendor.

Figure 6:
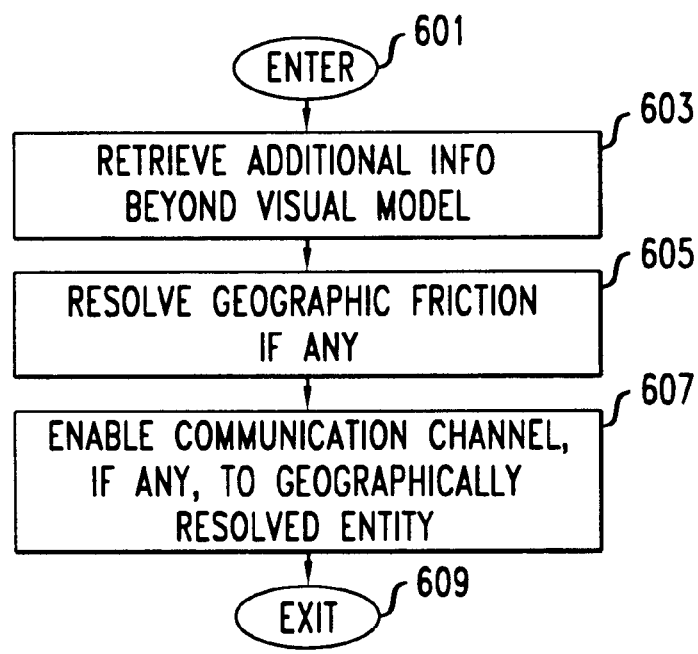
FIG. 6 shows steps of a process by which aspects of the invention may be implemented.

In accordance with another aspect of the invention, when the proprietor of a virtual store, or his representative, e.g., electronic agent, detects the avatar of one or more persons passing the avatar of a store for which such proprietor's store corresponds to the virtual store for such passing persons, a message, such as an advertisement, or other communication, such as opening a communication channel, e.g., a chat service or voice communication channel, may be transmitted to, or initiated with, such passing persons. The communication may be general in nature or it may be customized as a function of information available regarding the passing persons. Advantageously, a feeling of community may be engendered in the virtual environment FIG. 6 shows steps of a process by which aspects of the invention may be implemented. The process of FIG. 6 is entered in step 601, which may be, for example, alter completion of execution of step 411 of FIG. 4 or step 507 of FIG. 5. Thereafter, in step 603, additional information which is necessary to support the permitted interaction between the viewer and the popped out object and is beyond what is necessary to simply generate the computer graphics visual model of the object is retrieved. Such information may be included along with the information associated with the video that is used to pop the object out of the video. In step 605 any geographic functions associated with the object are resolved. For example, if the object which popped out of the video was a vendor's cart, such as may be found when bicycling around Central Park in New York City, the geographic function may specify a restaurant of the type that serves the same kind of food that is available from vendor cart. Such food may include, for example, frankfurters, hamburgers, sodas and snacks. The type of restaurant that corresponds to the cart is then used along with the actual physical location in the real world of the user, e.g.. Omaha, Neb., to determine a local restaurant that serves food of the same type and provides delivery service. The information provided by exploring the cart is linked to information corresponding to the determined restaurant, e.g., available menu selections and prices therefor. The viewer may order an item from the restaurant by manipulating objects on the cart, and the restaurant could then deliver them directly to the viewer. Advantageously, users who are in different real world locations but are jointly negotiating a virtual world, may be supplied with substantially the same services, enhancing their experience in the virtual world. When there is more than one restaurant to which the object may be associated, the resolution of the object may also be made dependent upon knowledge about the user, such as may be stored in a user profile.

Next, in step 607, a communication channel may be enabled between the popped out object and an entity, which may have been geographically resolved as described above. For example, if the popped out object is the above-described vendor cart, a communication channel may be opened to the corresponding restaurant, or an agent therefor. The restaurant may transmit a message, such as "Get your hot dogs and cold soda here." The message may be manifest by having an avatar of a vendor behind the cart appear to speak the message, either using text-to-speech or by having a representation of the speech transmitted directly. A so-called "chat" service may be used to enable bidirectional communication between the viewer and the vendor.

Another exemplary object to which a communication channel may be opened is a billboard. Such billboards may operate in one of several ways. For example, the billboard when popped out may signal an advertiser of the approach of a potential customer and in response thereto the advertiser may immediately transmit a message to the billboard, in accordance with an aspect of the invention. The particular advertiser selected may be fixed worldwide for all viewers, or it may be geographically resolved for each viewer. Alternatively, the billboard when popped out may signal an advertiser of the approach of a potential customer and enable the advertiser to transmit a message to the billboard should the advertiser wish to do so, e.g., after having reviewed information which may be sent to it about the viewer, in accordance with an aspect of the invention.

The process exits in step 609 and then the processes of FIGS. 4 or 5 may be resumed.

The process of FIG. 6 need not be limited to occurring within the time span of one frame.

Those of ordinary skill in the art will recognize that any simulation of a joint exploration of a world may employ the principles of the invention. For example, users exploring a world may take together automobile rides, boat rides, plane rides, train rides, and even spaceship rides. A rowboat ride may be arranged for users having rowing machines which are coordinated with images of the world seen by the users. Alternatively, the users may be walking together through the world, e.g., each user walks on his own treadmill which is coordinated with images of the world seen by the users. Similarly, users can ski together, e.g., each is on a skiing simulator machine, such as a Nordictrak, which is coordinated with the images of the world seen by the users. In addition, other forms of commercial transactions may be engaged in besides shopping. For example, users motoring down a virtual highway together may encounter a toll booth which pops out of the screen, and at least one of the users must pay the toll before their exploration of the world is allowed to proceed. Similarly, users may approach an attraction such as a virtual amusement park or a virtual safari. Ticket booths which appear on the video screen may pop out from the video screen and the users must each obtain, e.g., buy, or have bought for them, a ticket in order to proceed into the attraction.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in accessing an object in a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object which is represented as part of said video on said video screen has moved, from the point of view of a viewer of said world, to a location that is off of said video screen, so that said object can no longer be displayed on said video screen and will disappear from said world;

changing the representation of said object from a video representation to one modeled as computer graphics whereby said object remains visible in said world, albeit not on said video screen, and said video screen continues to exist in said world;

receiving an indication of a selection of said object by said viewer when said object's representation is modeled as computer graphics; and accessing additional information about said selected object.

2. The invention as defined in claim 1 wherein said object is a billboard.

3. The invention as defined in claim 1 wherein said object is a store.

4. The invention as defined in claim 1 wherein said object is a vendor stand.

5. The invention as defined in claim 1 wherein said object is a garage sale.

6. The invention as defined in claim 1 wherein said additional information is determined as a function of specified parameters of said viewer of said world.

7. The invention as defined in claim 1 wherein said additional information is determined as a function of a location in the real world of said viewer of said world.

8. The invention as defined in claim 1 wherein said additional information is determined as independent of a location in the real world of said viewer of said world.

9. The invention as defined in claim 1 wherein said additional information is determined as a function of preferences of said viewer of said world.

10. The invention as defined in claim 1 wherein said object is a store selected from among a plurality of stores as a function of a location of said viewer and said additional information is relevant to objects for sale at said store.

11. The invention as defined in claim 1 wherein said object is a store selected from among a plurality of stores as a function of specified parameters of said viewer and said additional information is relevant to objects for sale at said store.

12. The invention as defined in claim 1 further including the step of opening a communication channel between said viewer of said world and a location defined as a function of said additional information.

13. The invention as defined in claim 1 wherein said additional information is determined as a function of a location in the real world of said viewer of said world and further including the step of opening a communication channel between a viewer of said world and a location defined as another function of said additional information.

14. A method for use by a plurality of users in exploring a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object which is represented as part of said video on said video screen has moved, from the point of view of at least one of said users, to a location that is off of said video screen, so that said object can no longer be displayed on said video screen and will disappear from said world;

changing the representation of said object from a video representation to one modeled as computer graphics whereby said object remains visible in said world, albeit not on said video screen, and said video screen continues to exist in said world;

receiving an indication of a selection of said object by a user when said object's representation is modeled as computer graphics; and transmitting to at least at least two distinct subsets of said plurality of users additional information about said selected object;

wherein said additional information about said selected object that is supplied one of said at least two distinct subsets of said plurality of users is different from the additional information about said selected object that is supplied to another of said at least two distinct subsets of said plurality of users.

15. The invention as defined in claim 14 wherein said object is an avatar of a store and wherein said additional information supplied to said one of said at least two distinct subsets of said plurality of users relates to a first real world store and wherein said additional information supplied to said other one of said at least two distinct subsets of said plurality of users relates to a second real world store, said first and second stores being different.

16. The invention as defined in claim 15 wherein said additional information actually supplied to said one of said at least two distinct subsets of said plurality of users and to said other of said at least two distinct subsets of said plurality of users is determined as a function of defined parameters regarding said one and said other distinct subsets.

17. A method for use in accessing an object in a three dimensional world in which a first portion of said world is modeled as computer graphics and a second portion of said world is represented by a video, wherein said video is made up of a sequence of images displayed on a video screen which exists in said first portion of said world, said video displaying a plurality of object, the method comprising the steps of:

determining that an object which was represented as part of said video on said video screen has moved, from the point of view of a user of said world, to a location that is off of said video screen, so that said object can no longer be displayed on said video screen and will disappear from said world;

changing the representation of said object from a video representation to one modeled as computer graphics whereby said object remains visible in said world, albeit not on said video screen, and said video screen continues to exist in said world; and opening a communication channel when an avatar of said user is within a specified distance of said object in said first portion of said world when said object's representation is modeled as computer graphics.

18. The invention as defined in claim 17 wherein said communication channel connects to a display avatar in said world.

19. The invention as defined in claim 17 wherein said communication channel connects to a billboard avatar in said world.

20. The invention as defined in claim 17 wherein said communication channel connects said user and an actor on behalf of said object.

21. The invention as defined in claim 20 wherein said actor is an autonomous agent representing said object.

22. The invention as defined in 17 wherein said communication channel is presented as a advertisement avatar in said first portion of said world.

23. The invention as defined in 17 wherein said communication channel is a voice channel.

24. The invention as defined in 17 wherein said communication channel is a data channel.

25. The invention as defined in 17 wherein said communication channel is a chat session.

26. A method for use in accessing an object in a three dimensional world in which a first portion of said world is modeled as computer graphics and a second portion of said world is represented by a video, wherein said video is made up of a sequence of images displayed on a video screen which exists in said first portion of said world, said video displaying a plurality of objects, said world being explored by a plurality of users, the method comprising the steps of:

determining that an object which was represented as part of said video on said video screen has moved, from the point of view of a user of said world, to a location that is off of said video screen, so that said object can no longer be displayed on said video screen and will disappear from said world;

changing the representation of said object from a video representation to one modeled as computer graphics whereby said object remains visible in said world, albeit not on said video screen, and said video screen continues to exist in said world; and opening a plurality of communication channels when an avatar of said user is within a specified distance of said object in said first portion of said world when said object's representation is modeled as computer graphics.

27. The invention as defined in claim 26 wherein a first of said communication channels connects said user and an actor on behalf of a first real world item represented by said object and a second of said communication channels connects said user and an actor on behalf of a second real world item represented by said object, said first and second actors being different.

28. The invention as defined in claim 26 wherein said a first communication channel of said plurality of communication channels connects to a first billboard avatar in said world and carries thereto, for display thereon, a first message and a second communication channel of said plurality of communication channels connects to a second billboard avatar in said world and carries thereto, for display thereon, a second message, said first message being different from said second message.

29. The invention as defined in claim 26 wherein a first communication channel of said plurality of communication channels connects said user and an actor on behalf of said object and a second communication channel of said plurality of communication channels connects a second user and another actor on behalf of said object, said first actor being different from said second actor and each of said first and second actors representing different respective real world items that are each represented in said world by said object.

30. A method for use in processing a view of a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object which is represented as part of said video on said video screen has moved, from the point of view of a viewer of said world, to a location that is off of said video screen, so that said object can no longer be displayed on said video screen and will disappear from said world;

revealing a representation of said object as computer graphics whereby said object remains visible in said world, albeit not on said video screen, and said video screen continues to exist in said world;

accessing additional information about said object not required to display said object as said computer graphics to said viewer having a viewpoint external to said object when said object's representation is modeled as computer graphics.

31. The invention as defined in claim 30 further including the step of prestoring said representation of said object as computer graphics.

32. The invention as defined in claim 30 further including the step of displaying said additional information to said viewer.

33. The invention as defined in claim 30 further including the step of displaying said additional information to said viewer in a window distinct from said computer graphics.

34. The invention as defined in claim 30 wherein said video displayed an exterior view of said object and wherein said additional information includes information for generating an interior view of said object.

35. A method for use in processing a view of a three dimensional world in which a first portion of said world is modeled as computer graphics and a second portion of said world is represented by a video displayed on a video screen which exists in said first portion of said world, wherein said video is made up of a sequence of images, the method comprising the steps of:

determining that an object which is represented as part of said video on said video screen has moved, from the point of view of a viewer of said world, to a location that is off of said video screen, so that said object can no longer be displayed on said video screen and will disappear from said world;

revealing a representation of said object as computer graphics whereby said object remains visible in said world, albeit not on said video screen, and said video screen continues to exist in said world;

arranging a data structure for said object as computer graphics so that said viewer can access other information about said object other than a view of its representation as computer graphics which was revealed as it moved to said location modeled as computer graphics when said object's representation is modeled as computer graphics.

36. A method for use in accessing an object in a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object which was represented as part of said video on said video screen has moved, from the point of view of a viewer of said world, to a location that is off of said video screen, so that said object can no longer be displayed on said video screen and will disappear from said world;

changing the representation of said object from a video representation to one modeled as computer graphics whereby said object remains visible in said world, albeit not on said video screen, and said video screen continues to exist in said world; and arranging a data structure for said object as computer graphics so that said viewer can access other information about said object other than a view of its representation as computer graphics to which it was changed when said object represented by said video moved to said location modeled as computer graphics.

37. The invention as defined in claim 36 further including the steps of:

receiving an indication of a selection of said object by said viewer; and accessing said additional information about said selected object.

38. The invention as defined in claim 37 wherein said additional information is displayed in a separate window.

39. The invention as defined in claim 37 wherein said additional information defines an interior view of said object.

40. The invention as defined in claim 37 wherein said additional information is used to associate said object with a real world object.

41. The invention as defined in claim 37 wherein said addtional information is used to associate said object with a real world object as a function of a real world location of said viewer of said object.

42. The invention as defined in claim 37 wherein said additional information is used to associate said object with a real world object as a function of preferences of said viewer of said object.

43. The invention as defined in claim 37 wherein said additional information is used to establish a communication channel between said object and a real world object as a function of a real world location of said viewer of said object.

44. The invention as defined in claim 37 wherein said additional information is used to establish a communication channel between said object and a real world object and wherein said real world object is selected as a function of a real world location of said viewer of said object.

* * * * *